(12) United States Patent
Park et al.

(10) Patent No.: US 9,913,280 B2
(45) Date of Patent: Mar. 6, 2018

(54) METHOD AND APPARATUS OF ALLOCATING RESOURCES FOR TERMINAL IN WIRELESS COMMUNICATION SYSTEM

(71) Applicants: Samsung Electronics Co., Ltd., Suwon-si (KR); KOREA UNIVERSITY RESEARCH AND BUSINESS FOUNDATION, Seoul (KR)

(72) Inventors: Yongseok Park, Seoul (KR); Hwangnam Kim, Seoul (KR); Chulho Lee, Suwon-si (KR); Min Kim, Seoul (KR); Hyunsoon Kim, Seongnam-si (KR); Woonghee Lee, Seoul (KR); Joon Yeop Lee, Seoul (KR)

(73) Assignees: SAMSUNG ELECTRONICS CO., LTD. (KR); KOREA UNIVERSITY RESEARCH AND BUSINESS FOUNDATION (KR)

( * ) Notice: Subject to any disclaimer, the term of this patent is extended or adjusted under 35 U.S.C. 154(b) by 127 days.

(21) Appl. No.: 14/968,009

(22) Filed: Dec. 14, 2015

(65) Prior Publication Data
US 2016/0174209 A1 Jun. 16, 2016

(30) Foreign Application Priority Data

Dec. 12, 2014 (KR) .......................... 10-2014-0179500

(51) Int. Cl.
*H04W 72/04* (2009.01)
*H04W 72/02* (2009.01)

(52) U.S. Cl.
CPC ......... *H04W 72/048* (2013.01); *H04W 72/02* (2013.01)

(58) Field of Classification Search
CPC ........................... H04W 72/02; H04W 72/048
See application file for complete search history.

(56) References Cited

U.S. PATENT DOCUMENTS

2005/0055406 A1* 3/2005 Singhai ................... H04L 47/10
709/206
2008/0229243 A1* 9/2008 Bauman .............. G06F 11/3466
715/810

(Continued)

OTHER PUBLICATIONS

Eropean Search Report for 15199510.7 dated May 9, 2016.

(Continued)

*Primary Examiner* — Benjamin H Elliott, IV
(74) *Attorney, Agent, or Firm* — McAndrews, Held & Malloy, Ltd.

(57) ABSTRACT

Disclosed is a terminal effectively allocating communication resources to individual processes run by the user. The terminal may update a list of running processes based on information for one or more processes, determining the amount of resources for each process in the list according to priority information of the process related information, and allocating resources to at least one process in the list according to the determined resource amounts. Accordingly, the terminal can adjust throughputs of individual processes to support quality of communication of a process having high priority. This disclosure relates to communication methods and systems that achieve convergence of 5G communication systems supporting even higher data rates after 4G systems and IoT technologies. Based on IoT technologies, this disclosure may be applied to intelligent services, including smart homes, smart buildings, smart cities, smart/connected cars, health-care applications, digital education applications, retail business applications, and security and safety services.

18 Claims, 11 Drawing Sheets

(56) References Cited

U.S. PATENT DOCUMENTS

| | | | |
|---|---|---|---|
| 2010/0011198 A1 | 1/2010 | Hooker et al. | |
| 2010/0037327 A1* | 2/2010 | Nakajima | G06F 21/31 |
| | | | 726/34 |
| 2010/0138189 A1* | 6/2010 | Reichert | G06F 11/362 |
| | | | 702/188 |
| 2012/0102497 A1 | 4/2012 | Stahl | |
| 2012/0265897 A1 | 10/2012 | Das et al. | |
| 2013/0176854 A1* | 7/2013 | Chisu | H04W 80/06 |
| | | | 370/241 |
| 2014/0282529 A1* | 9/2014 | Bugenhagen | G06F 9/45558 |
| | | | 718/1 |
| 2016/0174209 A1* | 6/2016 | Park | H04W 72/048 |
| | | | 370/329 |

OTHER PUBLICATIONS

ERICSSON: "Simulation results for UL prioritization", R2-070219, XP050133320, Jan. 12, 2007.
European Search Report for 15199510.7 dated May 29, 2017.

* cited by examiner

FIG. 4

```
struct socket_information{
        pid;
        ppid;
        delayedAckMaxCount;
        priority;
        protocol;
        process_list;
}
```

METHOD AND APPARATUS OF ALLOCATING RESOURCES FOR TERMINAL IN WIRELESS COMMUNICATION SYSTEM

RELATED APPLICATION(S)

This application claims the benefit under 35 U.S.C. § 119(a) of Korean patent application filed on Dec. 12, 2014 and assigned Serial No. 10-2014-0179500, the entire disclosure of which is hereby incorporated by reference.

BACKGROUND

The present disclosure relates to wireless communication. More particularly, the present disclosure relates to a method and apparatus that enable a terminal to effectively allocate communication resources to individual processes run by the user.

To cope with the increasing demand for wireless data traffic after commercialization of 4G communication systems, active efforts are underway to develop enhanced 5G or pre-5G communication systems. As such, 5G or pre-5G communication systems are referred to as beyond 4G communication systems or post Long Term Evolution (LTE) systems. To achieve high data rates, use of the extremely high frequency (mmWave) band (e.g. 60 GHz band) is expected in a 5G communication system. To reduce propagation path loss and to increase propagation distance at the mmWave band, use of various technologies such as beamforming, massive multiple-input multiple-output (MIMO), full dimensional MIMO (FD-MIMO), array antenna, analog beamforming and large scale antenna are under discussion for 5G communication systems.

To enhance system networks, various technologies such as evolved or advanced small cell, cloud radio access network (cloud RAN), ultra-dense network, device-to-device (D2D) communication, wireless backhaul, moving network, cooperative communication, Coordinated Multi-Points (CoMP) and interference cancellation are under development for 5G communication systems. In addition, for 5G communication systems, a hybrid of frequency shift keying (FSK) and quadrature amplitude modulation (QAM) called frequency and quadrature amplitude modulation (FQAM) and sliding window superposition coding (SWSC) are under development for advanced coding modulation (ACM), and filter bank multi carrier (FBMC), non-orthogonal multiple access (NOMA) and sparse code multiple access (SCMA) are under development for advanced access.

Meanwhile, the Internet is evolving from a human centered network where humans create and consume information into the Internet of Things (IoT) where distributed elements or things process and exchange information. Big data processing through cloud servers and IoT technology are being combined into the Internet of Everything (IoE). To realize IoT services, base technologies such as sensing, wired/wireless communication and network infrastructure, service interfacing and security are needed, and technologies interconnecting things such as sensor networks, Machine-to-Machine (M2M) or Machine Type Communication (MTC) are under development. In IoT environments, it is possible to provide intelligent Internet technology services, which collect and analyze data created by interconnected things to add new values to human life. Through convergence and combination between existing information technologies and various field technologies, IoT technology may be applied to various areas such as smart homes, smart buildings, smart cities, smart or connected cars, smart grids, health-care, smart consumer electronics, and advanced medical services.

Accordingly, various attempts are being made to apply 5G communication systems to IoT networks. For example, sensor networks and machine-to-machine or machine type communication are being realized by use of 5G communication technologies including beamforming, MIMO and array antennas. Application of cloud RANs to big data processing may be an instance of convergence of 5G communication technology and IoT technology. Meanwhile, in recent years, a wireless communication device tends to perform various tasks such as notification, backup and data transmission at the same time. A user may frequently use a multi-communication feature by surfing the Web while receiving news and weather information or by viewing moving images while updating the software. As such, when an existing communication scheme treating individual connections equally is used, if some communication bandwidth is not sufficient or the device cannot properly support the communication demand, the user is unable to receive a high-quality service.

Most Internet services excluding real-time services tend to generate burst traffic. Hence, when two or more services are provisioned at the same time, relative service speed is lowered. Frequent occurrences of this phenomenon may cause the user to experience service quality degradation. In such a case of resource shortage, communication resources should be effectively allocated to guarantee suitable data rates at least for applications currently being used by the user. However, this priority is not considered in basic communication protocols.

In related art schemes, as increasing transmission speed to enhance transmission quality is not considered, when sufficient throughput (amount of data processed per unit time) is not guaranteed for a high-priority application, it is very difficult to directly regulate the application. The throughput increment is important because it can be used to secure minimum communication resources. For example, in Internet telephony service continuous communication is required, where even temporary loss of Internet connection can lead to a failure for a call. However, to sustain such continuous communication, priority-based throughput for securing minimum communication resources has not been applied yet. This may encourage a fast application to occupy the limited throughput regardless of priority, aggravating unfairness in transmission speeds when several applications are communicating to other devices or servers.

Furthermore, a base amount of memory is allocated by default to each socket. When a buffer with a given size is assigned to every socket, a considerable amount of memory is occupied. In such a case, efficient memory management may not be possible in smartphones and devices having a small memory capacity such as wearable devices or IoT devices.

FIG. 1 illustrates average buffer usage rates for individual processes in a terminal.

As shown in FIG. 1, each process can actually use a buffer much smaller than the default buffer allocated by default. This indicates the problem of buffer waste in the existing system.

SUMMARY

An aspect of the present disclosure is to provide a method and apparatus that allocate resources for a terminal in a wireless communication system by differentially adjusting throughputs of individual processes in the terminal in consideration of their priorities.

In accordance with an aspect of the present disclosure, there is provided a method of resource allocation for a terminal in a wireless communication system. The method may include: updating a running process list based on process related information for one or more processes; determining a resource amount for each process listed in the running process list according to priority information of the process related information; and allocating resources to at least one process listed in the running process list according to the determined resource amount for the at least one process.

In accordance with another aspect of the present disclosure, there is provided a terminal including: a communication unit configured to transmit and receive signals; and a control unit configured to: update a running process list based on process related information for one or more processes, determine a resource amount for each process listed in the running process list according to priority information of the process related information, and allocate resources to at least one process listed in the running process list according to the determined resource amount for the at least one process.

In a feature of the present disclosure, throughputs of individual processes in the terminal are adjusted so as to support the quality of communication of a process having a high priority. Hence, it is possible to heighten the quality of experience of the user. Additionally, to adjust the throughput, the buffer, advertised window size and maximum count for delayed acknowledgements (delayed ACK max count) are adjusted. Hence, it is possible to increase the transmission speed of a process having a high priority while avoiding excessive memory usage.

BRIEF DESCRIPTION OF THE DRAWINGS

The above and other aspects, features, and advantages of certain embodiments of the present disclosure will be more apparent from the following detailed description taken in conjunction with the accompanying drawings, in which:

FIG. 4 illustrates a new data structure containing information on individual processes added to the existing socket structure according to an embodiment of the present disclosure;

DETAILED DESCRIPTION

Figure 1:
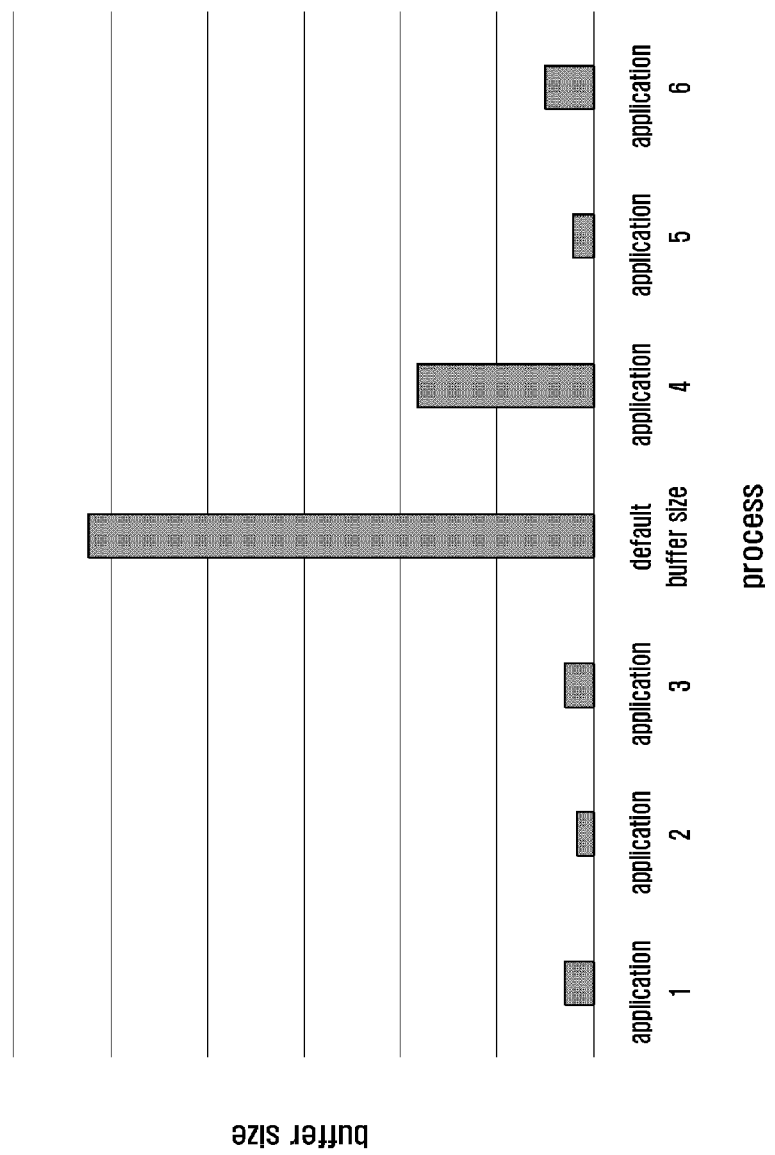
FIG. 1 illustrates average buffer usage rates of individual processes in a terminal.

Hereinafter, embodiments of the present disclosure are described in detail with reference to the accompanying drawings.

Detailed descriptions of well-known functions and structures incorporated herein may be omitted to avoid obscuring the subject matter of the present disclosure.

In the drawings, some elements are exaggerated, omitted, or only outlined in brief, and thus may be not drawn to scale. The same or similar reference symbols are used throughout the drawings to refer to the same or like parts.

The aspects, features and advantages of certain embodiments of the present disclosure will be more apparent from the following detailed description taken in conjunction with the accompanying drawings. The description of the various embodiments is to be construed as exemplary only and does not describe every possible instance of the present disclosure. It should be apparent to those skilled in the art that the following description of various embodiments of the present disclosure is provided for illustration purpose only and not to limit the present disclosure as defined by the appended claims and their equivalents. The same reference symbols are used throughout the description to refer to the same parts.

It is known to those skilled in the art that blocks of a flowchart (or sequence diagram) and a combination of flowcharts may be represented and executed by computer program instructions. These computer program instructions may be loaded on a processor of a general purpose computer, special purpose computer or programmable data processing equipment. When the loaded program instructions are executed by the processor, they create a means for carrying out functions described in the flowchart. As the computer program instructions may be stored in a computer readable memory that is usable by a specialized computer or a programmable data processing equipment, it is also possible to create articles of manufacture that carry out functions described in the flowchart. As the computer program instructions may be loaded on a computer or a programmable data processing equipment, when executed as processes, they may carry out operations of functions described in the flowchart.

A block of a flowchart may correspond to a module, a segment or a code containing one or more executable instructions implementing one or more logical functions, or to a part thereof. In some cases, functions described by blocks may be executed in an order different from the listed order. For example, two blocks listed in sequence may be executed in parallel or executed in reverse order.

In the description, the word "unit", "module" or the like may refer to a software component or hardware component such as an FPGA or ASIC capable of carrying out a function or an operation. However, "unit" or the like is not limited to hardware or software. A unit or the like may be configured so as to reside in an addressable storage medium or operate with one or more processors. Units or the like may refer to software components, object-oriented software components, class components, task components, processes, functions, attributes, procedures, subroutines, program code segments, drivers, firmware, microcode, circuits, data, databases, data structures, tables, arrays or variables. A function provided by a component and unit may be a combination of smaller components and units, and may be combined with others to compose large components and units. Components and units may be configured to drive a device or one or more processors in a secure multimedia card.

The Transmission Control Protocol (TCP) is a transport layer protocol guaranteeing reliability. In TCP, to determine whether data is successfully sent, whenever a packet is sent, an acknowledgement (ACK) is received from the receiver. When a packet is deemed to be lost due to no ACK being sent by the receiver within a time-out period, the packet is resent. Since there is acknowledgment of each packet received, data to be sent is delivered reliably. As the amount of data transmitted may be increased or decreased by increasing or reducing the advertised window size according to the state of the connection or the quality of communication, TCP may adapt to flexibly the circumstances.

The User Datagram Protocol (UDP) is a protocol that uses a datagram as a unit of transmission. UDP does not guarantee delivery of data or reliability thereof. In UDP, the receiver is unaware of the amount of data to be sent by the sender and does not handle the order of arrival of datagrams or lost datagrams; and the sender cannot determine whether data has been successfully received by the receiver. However, the corresponding application may determine whether data is lost and notify the sender of lost data. UDP is simple, fast, and does not cause heavy network load.

A buffer refers to memory used to temporarily store data to be sent or received. TCP buffer tuning is a technique used to determine and adjust the size of the TCP buffer for each connection, and may be performed manually by the network manager (manual tuning) or performed automatically by the tuning demon or tuning algorithm (automatic tuning). Automatic tuning may be performed only at the time of connection establishment (static tuning) or performed continuously according to network state changes (dynamic tuning). TCP buffer tuning may be applied to adjust the size of incoming packets by increasing or decreasing the size of allocated buffer space so as to match the window size needed for TCP communication.

A window is a concept used to adjust the amount of data sent by the sender to the network. The size of the window varies with communication states. When a socket is opened to initiate communication, a buffer of a default size is allocated to the socket and the size of the buffer may be varied between a preset minimum and a preset maximum later if necessary. In TCP, the receive window at the receiver indicates the size of data that the receiver may receive at once. The receive window size is notified or advertised to the sender (advertised window). The buffer indicates the upper limit of the receive window.

In computer related fields, a process indicates a program in execution. A program may be an application. In this disclosure, the words "program" and "application" may be used interchangeably. A socket is related to creation of a process for communication with a data transmission device. The socket may include a channel to communicate with the data transmission device. The socket structure associated with the process may include information on the process.

Figure 2:
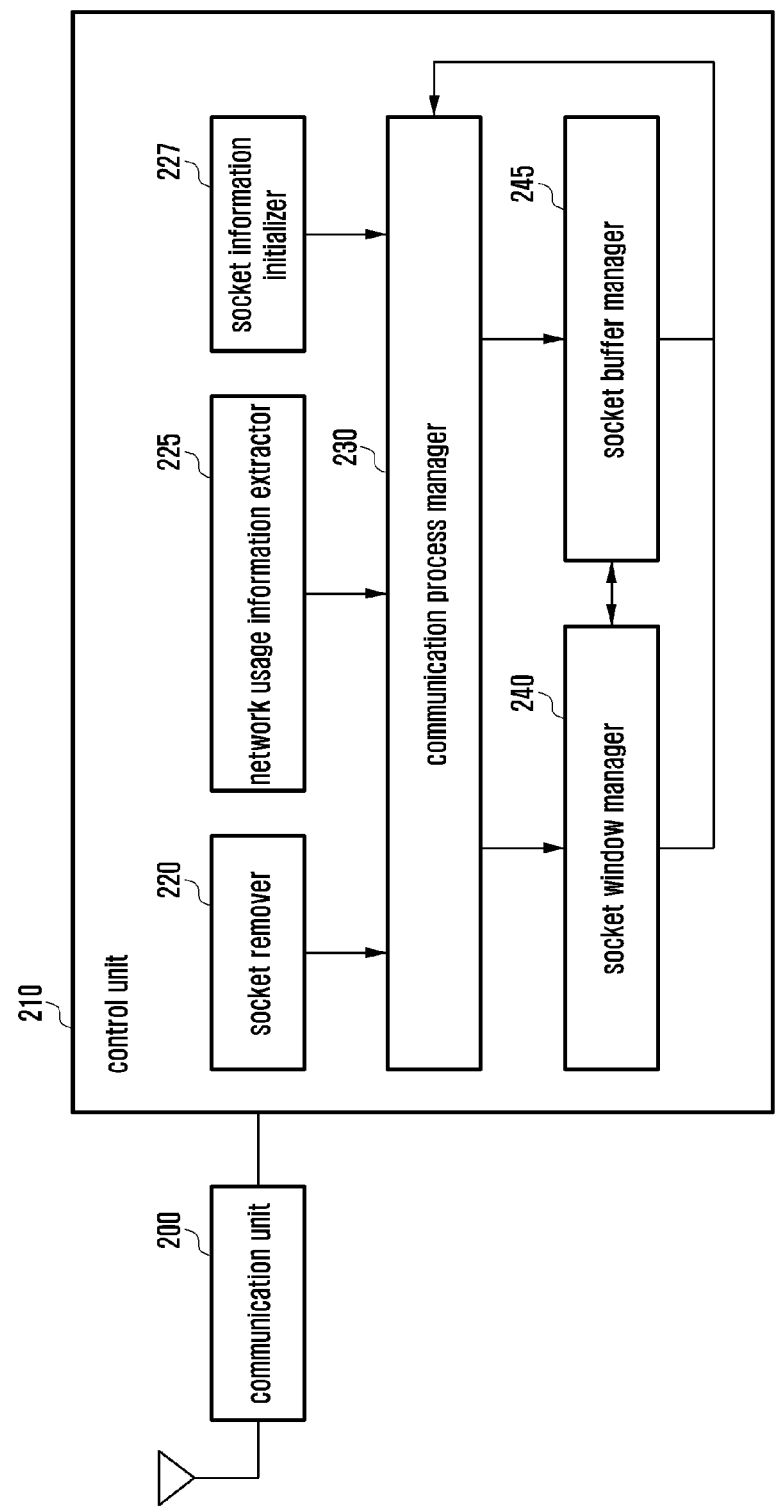
FIG. 2 is a block diagram of a terminal according to an embodiment of the present disclosure.

FIG. 2 is a block diagram of a terminal according to an embodiment of the present disclosure.

Referring to FIG. 2, the terminal supporting resource allocation may include a communication unit 200 and a control unit 210. The control unit 210 may include a socket remover 220, a network usage information extractor 225, a socket information initializer 227, a communication process manager 230, a socket window manager 240, and a socket buffer manager 245. The configuration of the control unit 210 is for illustration only, and other configurations capable of achieving the object of the present disclosure are possible. The functions of the components of the control unit 210 may be performed directly by the control unit 210.

The communication unit 200 may send and receive signals to and from a sender device. The communication unit 200 may include a wireless communication module. The communication unit 200 may send an ACK to the sender device as a response to reception of data from the sender device.

In the control unit 210, the socket information initializer 227 may analyze a newly created socket and insert base information used in the present disclosure in the socket structure. For easy management of process information, the socket information initializer 227 may create a new data structure and add it to the existing socket structure.

The network usage information extractor 225 monitors patterns of data communication in the system and records the amount of data communication and patterns thereof for each process. Characteristic information about data communication for processes recorded by the network usage information extractor 225 is not removed upon system turnoff, but is accumulated over system turnoffs. The characteristic information becomes more accurate with usage of processes by the user. This characteristic information about data communication of processes is forwarded to the communication process manager 230.

The socket remover 220 collects information on sockets deleted from the kernel. When a socket created through the socket information initializer 227 is removed, the socket remover 220 identifies the socket to be removed, collects information on the socket, and forwards the collected information to the communication process manager 230. Accordingly, the communication process manager 230 may keep the communication process list as up-to-date as possible and may make a correct decision on resource management and allocation for communication processes.

The communication process manager 230 monitors those processes involved in data communication and allocates resources to the processes in a suitable manner by use of information provided by the socket information initializer 227, socket remover 220, and network usage information extractor 225. The communication process manager 230 makes a decision on resource allocation, adjusts the amount of resources allocated to each process in a continuous manner, and sets the delayed ACK max count for each socket. The delayed ACK max count is explained below with reference to FIG. 4. The resource allocation plan determined by the communication process manager 230 is forwarded to the socket window manager 240 and the socket buffer manager 245.

The socket window manager 240 and the socket buffer manager 245 adjust the window size of a corresponding socket and the buffer size of the socket, respectively, according to the resource allocation plan provided by the communication process manager 230. In particular, to increase the amount of resources allocated to a socket, the buffer is adjusted by the socket buffer manager 245 first, and then the window size is adjusted by the socket window manager 240. To decrease the amount of resources allocated to a socket, the window size is adjusted by the socket window manager 240 first, and then the buffer is adjusted by the socket buffer manager 245. This work flow change may prevent loss of received data.

Figure 3:
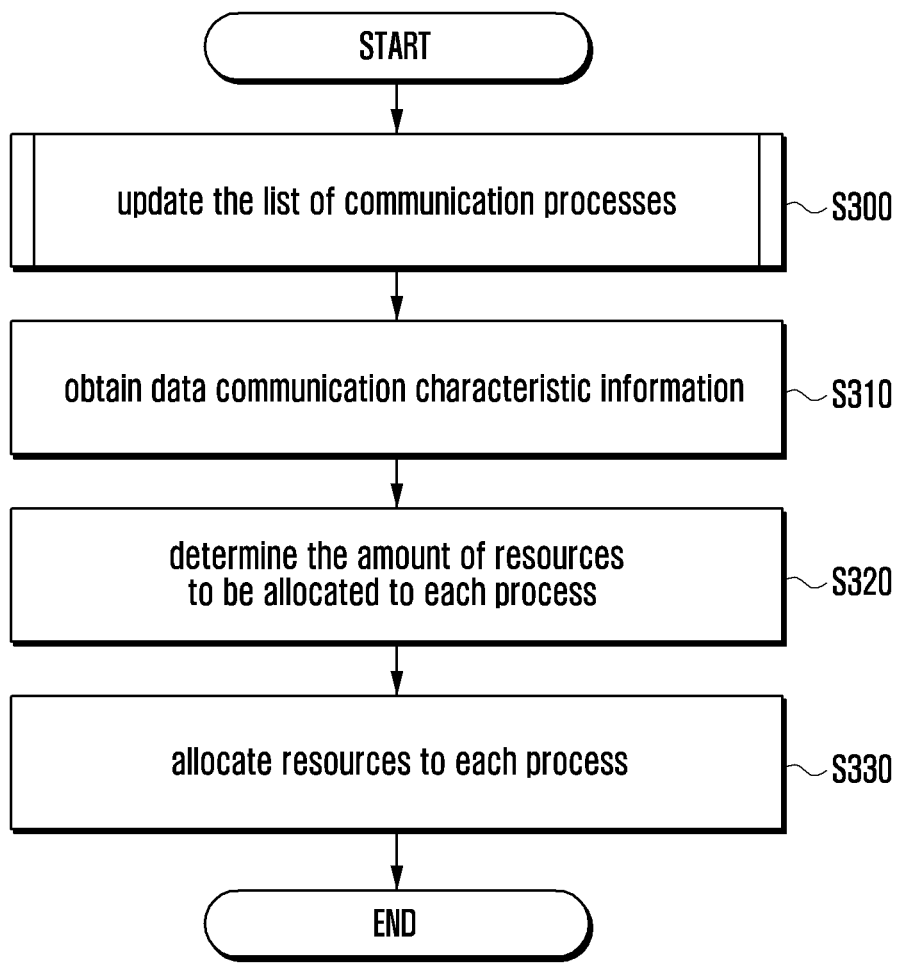
FIG. 3 is a flowchart of a procedure for allocating resources to individual processes in the terminal according to an embodiment of the present disclosure.

FIG. 3 is a flowchart of a procedure whereby the control unit of the terminal allocates resources to individual processes in execution according to an embodiment of the present disclosure.

At operation S300, the terminal updates the list of communication processes in execution. Specifically, the terminal may identify processes engaged in communication by adding the process associated with a newly created socket to the communication process list and deleting the process associated with a removed socket from the communication process list. In this disclosure, the list of communication processes may indicate the list of processes in execution, and so the list of processes in execution may be used interchangeably with the list of communication processes. When a socket is created by a process, pieces of information for the present disclosure may be stored in the data structure of the socket. The terminal may use information stored in the socket structure to update the list of communication processes. The new data structure containing process information is illustrated in FIG. 4, and is added to the existing socket structure.

At operation S310, when the list of communication processes is not present, the terminal obtains data communication characteristic information for each process. That is, the terminal may record data communication characteristic information on the basis of a process in execution, and the data communication characteristic information may contain information on the amount and pattern of data communication for each process. Here, the recorded amounts of data communication may be, for example, averaged and the average amount of data communication may be used to determine resource allocation on a process basis. Any scheme may be used to compute the average amount of data communication without departing from the scope of the present disclosure.

At operation S320, the terminal makes a decision on resource allocation for each process. The resources may be allocated in consideration of the amount of allocable resources, processes currently used by the user, and properties of the processes. In particular, the communication quality of a process having a high priority is to be considered first. Reduction of resources allocated to low-priority processes should not cause the processing to end, and the minimum amount of allocated resources should enable the processing to proceed. In making the resource allocation decision, the case where the amount of communication resources needed or requested by a high-priority process is greater than the amount of available communication resources may be separated from the case where the amount of communication resources needed or requested by a high-priority process is less than the amount of available communication resources. To meet the above criteria, the resource allocation decision may be made on the basis of the list of communication processes, and priority information and data communication characteristic information of each process. Making the resource allocation decision is described in detail later with reference to FIG. 6.

At operation S330, the terminal performs resource allocation for each process. Specifically, for resource allocation, the terminal may adjust the buffer size and the advertised window size to thereby change the amount of data processed per unit time (throughput) for each process. In addition, the terminal may adjust the delayed ACK max count to adjust the speed of change in the transmit window size at the sender. That is, the terminal may control the increment and decrement in the transmission speed of a high-priority process or a low-priority process according to the per- process resource allocation decision made at operation S320. Resource allocation for each process is described in detail later with reference to FIG. 8.

FIG. 4 illustrates a pseudo code for process information that may be added to the existing socket structure.

When a socket is created by a process in the terminal, the process information is stored in the socket structure. Specifically, the socket structure may have a process identifier, a parent process identifier, priority information, protocol information, and the delayed ACK max count. In addition to the above information items, other information items may be added to the socket structure if necessary without departing from the scope of the present disclosure. The new structure having the above information items added to the existing socket structure is labeled as "socket_information" as shown in FIG. 4.

The structure socket_information may have 6 members—pid, ppid, delayedAckMaxCount (or, delayed ACK max count), priority, protocol, and process_list. The process identifier (PID) is a number assigned to a process for identification. When a new process is created by the operating system, a PID is assigned to the new process. For example, in the operating system such as UNIX, a new process is created by the "fork" system call and a PID is assigned to the new process.

The parent process identifier (PPID) is a process identifier assigned to a process (parent) that has created one or more other processes (child or children) via, for example, the fork system call. That is, the process that invoked "fork" is the parent process and the newly created process is the child process. When the terminal is running, many processes including those used by the user are executed in parallel. These processes constitute a hierarchy or a "tree" based on the parent-child relationships. In this disclosure, the focus is on the processes used by the user, the PPID is used to clearly describe process characteristics distinct from those of other system processes.

The delayed ACK max count indicates the period in which the terminal sends an ACK response to the data sender. That is, to use delayed acknowledgement for reducing the number of ACK responses, up to delayedAckMaxCount number of ACK responses may be combined into one ACK response. For example, when the delayed ACK max count is set to 2, up to two ACK responses may be combined into one ACK response for transmission. If a preset time expires during delayed acknowledgement (timeout), the delayed ACK responses waiting to be sent are sent immediately.

As the sender determines successful delivery of packets on the basis of not the number of ACK responses but the sequence number indicated by the last ACK response, the number of ACK responses sent by the receiver may be reduced without a significant problem. However, reduction of the number of ACK responses may slow the increment of the transmit window size at the sender. As such, in the present disclosure, different delayed ACK max counts are assigned to processes according to their priorities so as to increase the quality of service (QoS) of a high-priority process. To better identify the delayed ACK max counts assigned to individual sockets, the delayed ACK max count determined by the communication process manager 230 is stored in the socket_information structure being added to the existing socket structure.

The priority information (priority) indicates the level of importance of a process. For process management, the operating system may assign a high priority to a process currently used by the user and assign a low priority to a process that has not been used for a while. When more memory is needed, the operating system may remove a process with the lowest priority first. The priority information may be used to identify a process currently being used.

The protocol information (protocol) indicates the type of a created socket. For example, when "SOCK_STREAM" is used as an argument for socket creation, a TCP socket is created, and when "SOCK_DGRAM" is used as an argument for socket creation, a UDP socket is created.

The list of communication processes (process_list) indicates the address of a list of communication processes managed by the communication process manager 230. This process_list contained in the new structure enables a process to access the communication process list at any time via a socket.

The terminal examines a created socket to identify the PID and PPID of a process having created the socket, and identifies the priority of the process using the identified PID. The terminal also identifies protocol information by checking whether the socket is used for TCP or UDP. The identified PID, PPID, priority, and protocol information are stored in the socket_information structure of the socket structure. The delayed ACK max count may be initialized to a default value of 2, and may be adjusted later by the communication process manager 230. Finally, to permit a process to access the communication process list at any time via the socket, the address of the list of communication processes managed by the communication process manager 230 is stored in the socket_information structure. The initialization of the socket information may be completed in this manner. The socket information initializer 227 performs socket initialization as described above and forwards the initialized socket information to the communication process manager 230.

Figure 5:
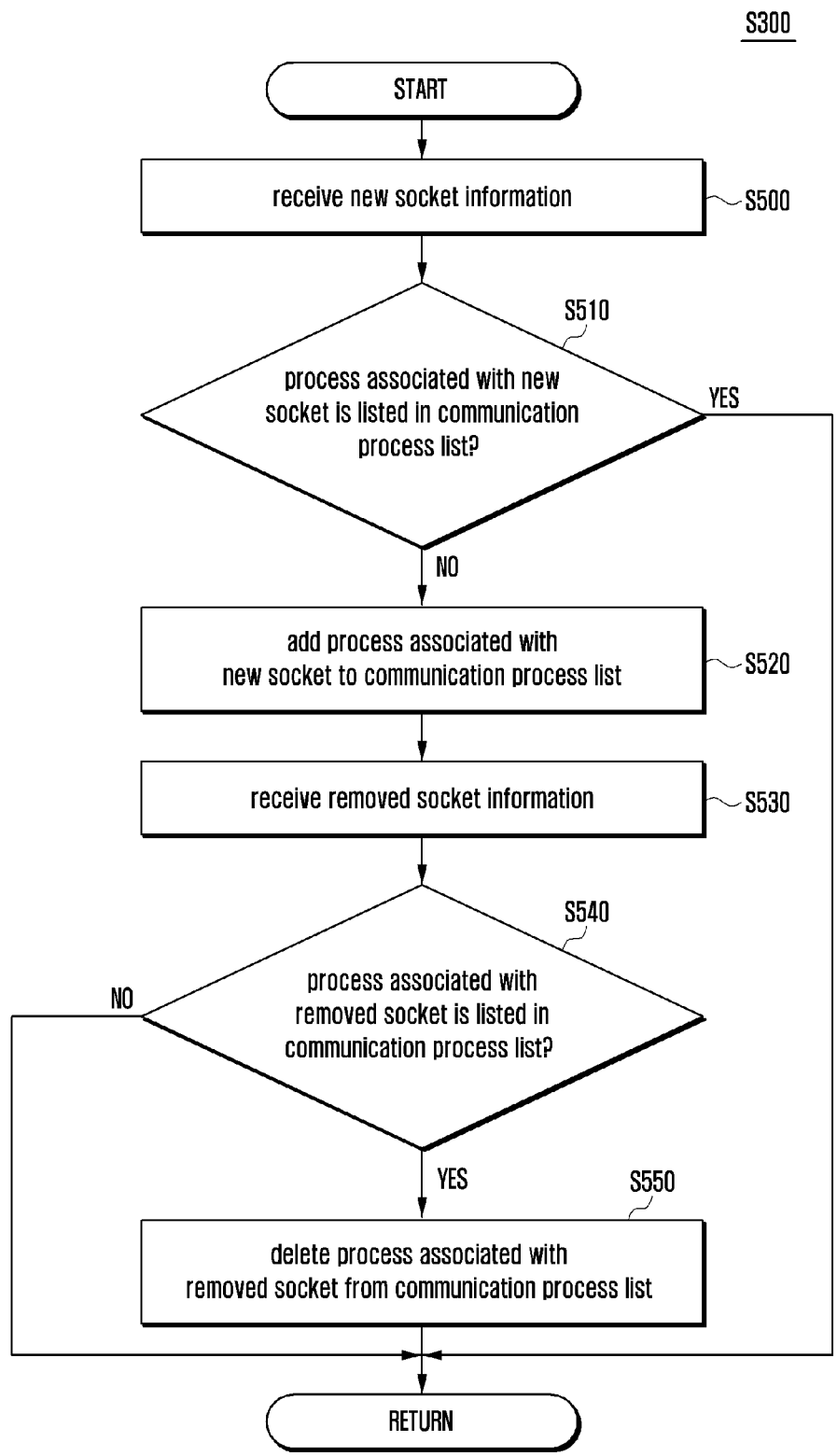
FIG. 5 is a detailed flowchart for operation S300 in the procedure of FIG. 3 according to an embodiment of the present disclosure.

FIG. 5 is a detailed flowchart for operation S300 in the procedure of FIG. 3 according to an embodiment of the present disclosure.

At operation S500, the terminal may receive socket information of a newly created socket. The terminal checks whether the process that created the new socket is a user process on the basis of the PPID and PID information contained in the socket structure of the new socket. If the new socket is created by a user process, at operation S510, the terminal checks whether the process that created the new socket is listed in the communication process list. The terminal may determine whether the process that created the new socket is listed in the communication process list on the basis of the protocol information of the socket structure and the list of communication processes matching the protocol information. If the process that created the new socket is listed in the communication process list, the procedure ends (i.e. returns to operation S310).

If the process that created the new socket is not listed in the communication process list, at operation S520, the terminal adds the process to the communication process list. Here, the terminal may extract and save the priority information of the socket structure.

At operation S530, the terminal may receive socket information of a deleted socket. The terminal checks whether the deleted socket is associated with a user process. If the deleted socket is associated with a user process, at operation S540, the terminal checks whether the process associated with the deleted socket is listed in the communication process list. If the process associated with the deleted socket is listed in the communication process list, at operation S550, the terminal removes the associated process from the communication process list. If the process associated with the deleted socket is not listed in the communication process list, the procedure ends (i.e. returns to operation S310). As described above, the terminal continuously updates the communication process list to thereby identify the processes currently in communication. By use of the communication process list, the terminal may identify processes running in the foreground and determine the priority of a process.

Next, a detailed description is given of making a resource allocation decision on a process basis in the terminal.

When the terminal executes multiple processes in parallel, resource allocation may be performed with a view to enhancing the QoS for the user by assigning the highest priority to a process used by the user and allocating more communication resources to the highest-priority process. The priorities of processes may be assigned differently for different performance criteria. As an instance of basic priority assignment, a high priority may be assigned to a foreground process involved in screen display, and a low priority may be assigned to a process running in the background.

The terminal may store the priority assigned to a process at the socket structure of a socket corresponding to the process. In addition, the terminal may determine the priority of a process by use of the corresponding data communication characteristic information. As such, the terminal may adjust the priority of a foreground process in a fine-grained manner by use of detailed information on communication connections (e.g. duration without communication activity).

Figure 6:
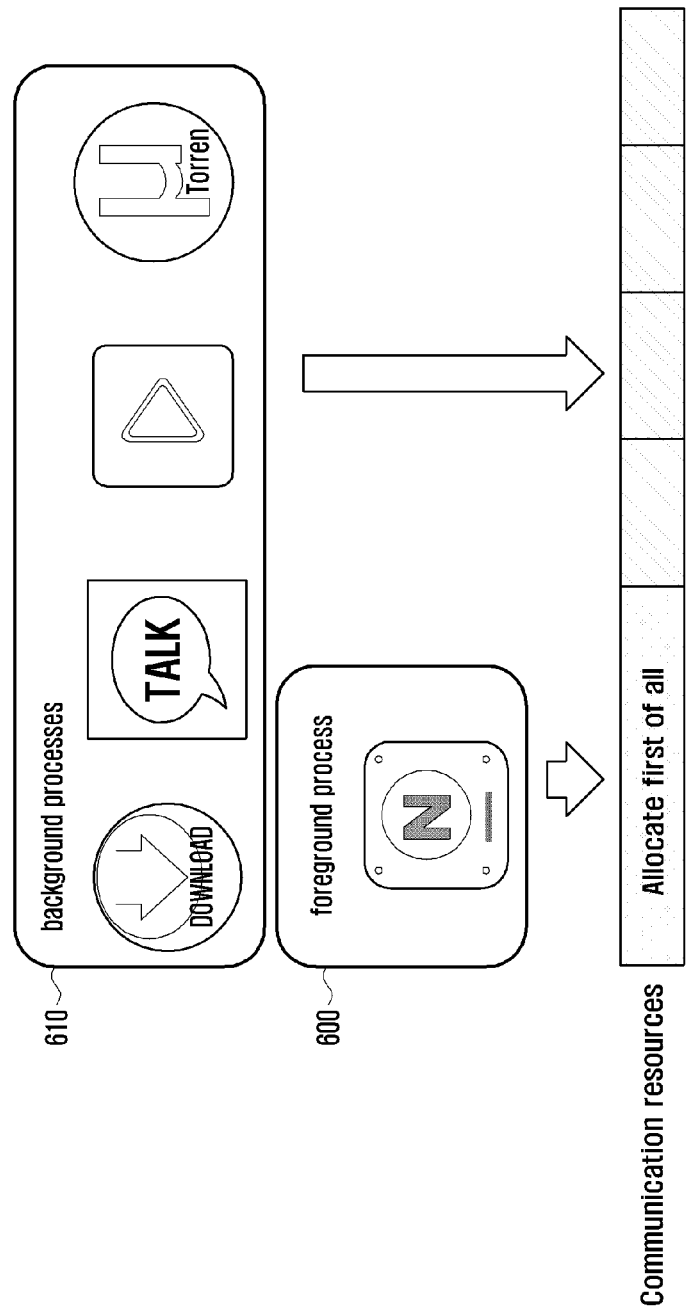
FIG. 6 illustrates allocation of resources to applications corresponding to running processes according to an embodiment of the present disclosure.

FIG. 6 illustrates allocation of resources to applications corresponding to running processes according to an embodiment of the present disclosure. In FIG. 6, a high priority is assigned to the process running in the foreground. In the present disclosure, different embodiments may assign priority according to different criteria. In FIG. 6, resources are allocated first to a process 600 running in the foreground and then to processes 610 running in the background.

Figure 7:
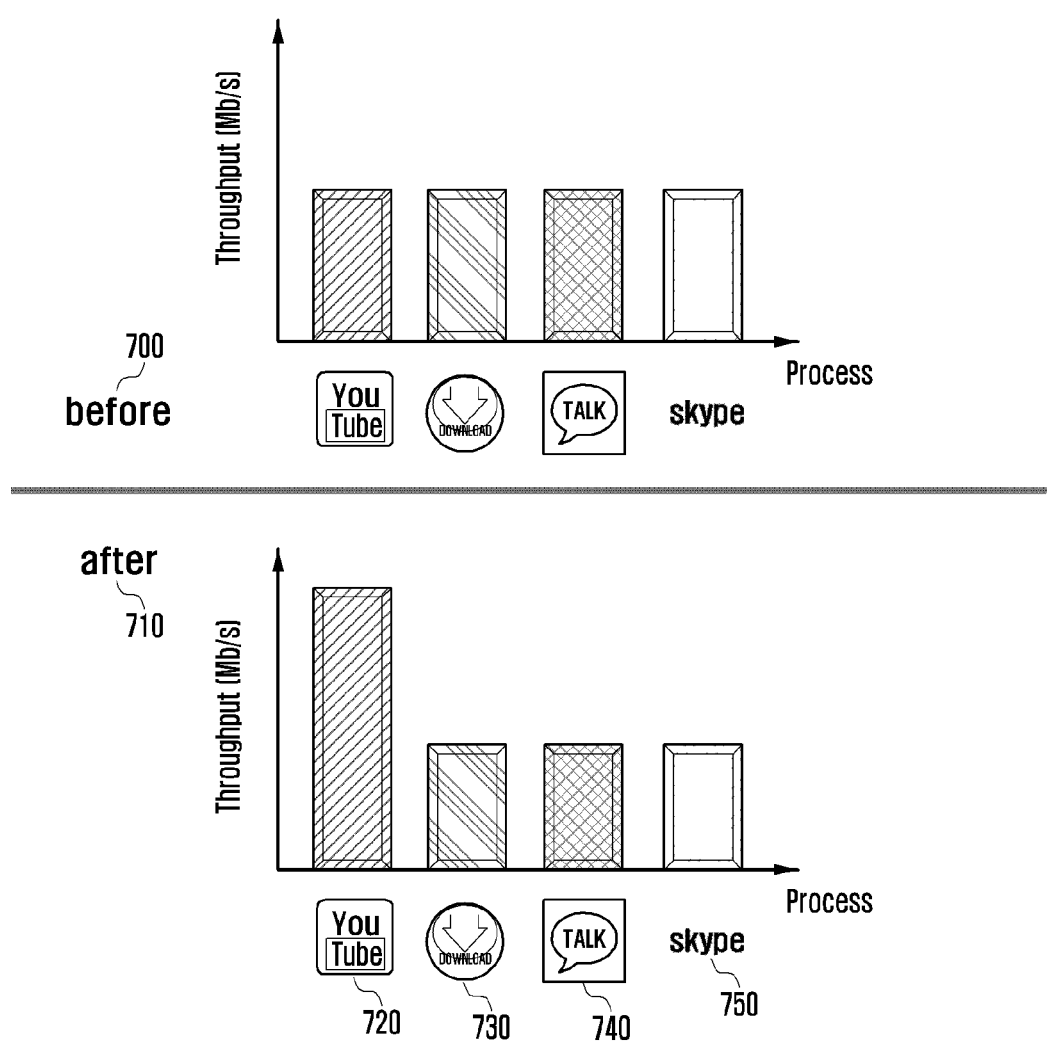
FIG. 7 depicts throughput adjustment on a process basis according to an embodiment of the present disclosure.

FIG. 7 depicts throughput adjustment on a process basis according to an embodiment of the present disclosure.

Specifically, FIG. 7 shows a result of comparison between chart 700 of before per-process throughput adjustment based on process priorities and chart 710 of after per-process throughput adjustment based on process priorities. As seen in chart 700, before resources are allocated to processes based on their priorities, the processes have the same throughput. However, as seen in chart 710, after resources are allocated to processes based on their priorities, the processes have different throughputs.

Chart 710 shows that as an application 720 running in the foreground is assigned a high priority, its throughput is raised. As applications 730, 740 and 750 are running in the background they are assigned low priorities, and their throughputs are lowered. The amount of communication resources allocated to the applications 730, 740 and 750 running in the background is reduced and the amount of communication resources allocated to the foreground process 720 is increased. This is an example of QoS enhancement by adjusting the communication throughput of the process currently being used by the user.

Next, a description is given of resource allocation for adjusting the throughput of a process based on the priority illustrated in FIG. 7. For resource allocation according to process priorities and data communication characteristic information, the terminal may consider the following two situations.

Situation 1: the amount of communication resources needed or requested by the highest-priority process is less than the amount of available communication resources.

Situation 2: the amount of communication resources needed or requested by the highest-priority process is greater than the amount of available communication resources.

Figure 8:
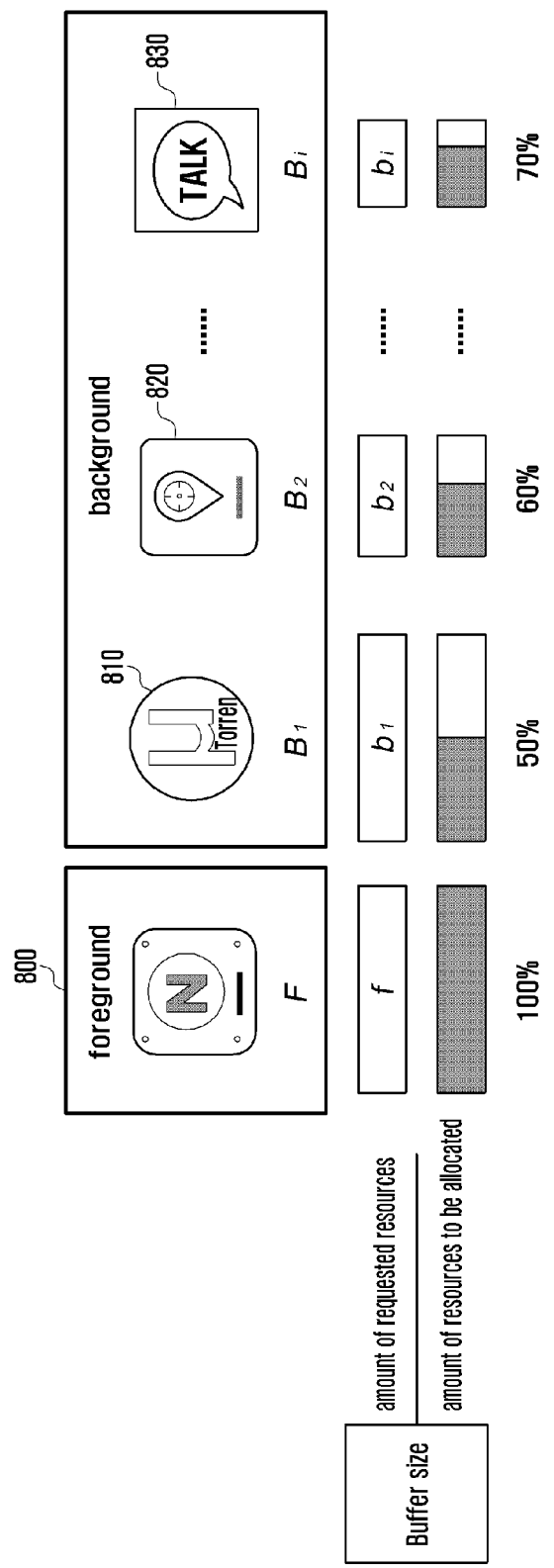
FIG. 8 depicts how the terminal allocates resources to individual processes according to an embodiment of the present disclosure.

FIG. 8 depicts how the terminal allocates resources to individual processes according to an embodiment of the present disclosure.

FIG. 8 depicts Situation 1, where some amount of available communication resources remains after the requested amount is allocated to the highest-priority process. Hence, it is necessary to properly allocate resources to lower-priority processes. Assume that i+1 processes are running in the terminal as shown in FIG. 8. Then, there may be one foreground process and i background processes.

Here, F indicates the foreground process 800 and f indicates the amount of resources needed or requested by the process indicated by F. $B_i$ indicates the $i^{th}$ background process 810, 820 or 830 and $b_i$ indicates the amount of resources needed or requested by the process indicated by $B_i$. In this case, f and $b_i$'s are determined according to data communication characteristic information of the corresponding processes. The data communication characteristic information may include the amount and pattern of data communication of the corresponding process. The recorded amounts of data communication may be, for example, averaged and the average amount of data communication may be used to determine resource allocation on a process basis. Any scheme may be used to compute the average amount of data communication without departing from the scope of the present disclosure. When $b_i$ is large (i.e. $B_i$ needs or requests a large amount of resources), the process $B_i$ may frequently compete with the process F for resources. When $b_i$ is small, the process $B_i$ may rarely compete with the process F for resources.

In the present disclosure, weight information may be used to allocate resources to the background processes 810, 820 and 830. The weight of a process may be determined in various ways. Basically, the weight of a process may be determined according to the amount of resources needed or requested by the process. Any scheme may be used to determine the weight of a process without departing from the scope of the present disclosure. For a background process 810, 820 or 830, the weight $\Phi_i$ for resource allocation may be determined using Equation 1.

$$\Phi_i = 1 - (b_i/(f+b_i)) = f/(f+b_i) \quad \text{[Equation 1]}$$

That is, when $b_i$ is large relative to f, $\Phi_i$ becomes small (i.e. only a small portion of the requested resource will be allocated to the process $B_i$). When $b_i$ is small relative to f, $\Phi_i$ becomes large (i.e. most of the requested resource will be allocated to the process $B_i$).

Additionally, to place more emphasis on the foreground process, a scaling parameter α may be introduced to Equation 1. As α becomes large, more emphasis is placed on the foreground process. Such a scaling parameter or other parameters may be introduced in various ways without departing from the scope of the present disclosure. For a background process 810, 820 or 830, the weight $\Phi_i$ for resource allocation may be determined using Equation 2 with scaling parameter α.

$$\Phi_i = 1 - (\alpha b_i/(f+\alpha b_i)) = f/(f+\alpha b_i) \quad \text{[Equation 2]}$$

$\Phi_i$'s may be re-determined every t time units in consideration of the communication process list, and priority information and data communication characteristic information of processes. $\Phi_i$'s may also be recomputed and updated when a communication process is changed. Accordingly, the amount of resources to be allocated to a process may be determined according to the product of the weight of the process ($\Phi_i$) and the amount of resources needed or requested by the process ($b_i$). Other various weighting schemes may be used according to decisions of the system developer without departing from the scope of the present disclosure.

Next, a description is given of resource allocation for Situation 2. In Situation 2, allocation of all available communication resources to the highest-priority process may not suffice to sustain the QoS level for the user. In this case, allocation of available communication resources to low-priority processes may further degrade the QoS level for the user. Hence, it is preferable to allocate as much communication resources as possible to the highest-priority process and to allocate minimum communication resources to other processes so as to sustain communication. Allocation of minimum resources sustaining communication may be, for example, allocating resources so that low-priority processes are allowed to receive unit packets. This is not to disconnect communication of the low-priority processes but to sustain communication thereof. Later, when the amount of communication resources needed or requested by the highest-priority process becomes small, the communication of the low-priority processes is smoothed. Thereby, it is possible to postpone communication activities of the low-priority processes.

In the scheme of the present disclosure, resources are allocated according to priorities of processes, and this is not considered in the existing buffer allocation scheme of TCP. As such, transmission resources may be concentrated on a high-priority process, heightening the quality of experience of the user. Resources concentrated on a high-priority process give precedence to the currently used service, leading to a higher level of user satisfaction. The resource allocation scheme of the present disclosure guarantees a minimum level of communication for low-priority processes and does not significantly lower the overall system communication speed.

Next, a description is given of allocating resources to processes according to the determined resource amount for each process. That is, resources are allocated to individual processes on the basis of the determined resource amount derived using the weight computed based on the priority information and requested resource amount for each process. In this case, a large amount of resources is allocated to a high-priority process and a small amount of resources is allocated to a low-priority process.

Figure 9:
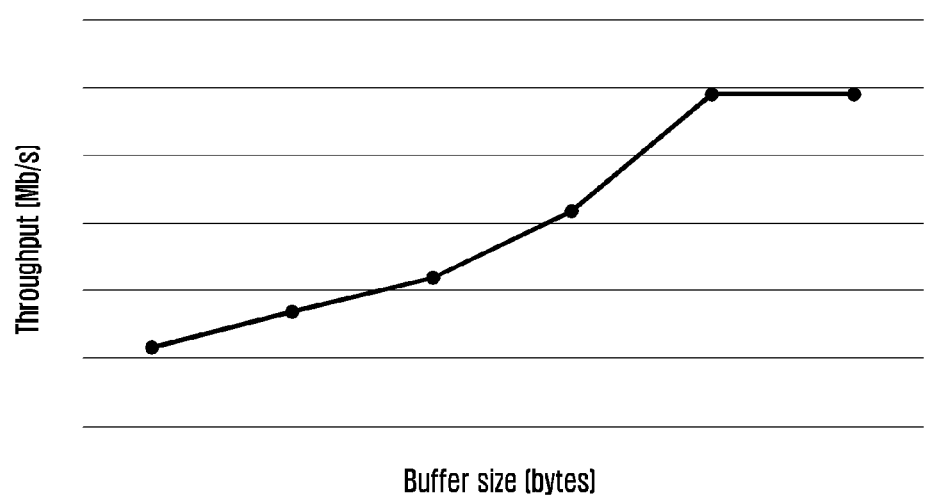
FIG. 9 illustrates changes in throughput due to buffer size adjustment according to an embodiment of the present disclosure.

Performing resource allocation for each process indicates adjusting the performance of the socket corresponding to the process. Specifically, the terminal may perform resource allocation by adjusting the buffer size and the advertised window size to thereby adjust the throughput of the corresponding process. FIG. 9 illustrates throughput adjustment for a process by changing the buffer size. Specifically, it can be seen that the throughput of a process increases with the increasing buffer size.

In TCP, the receive window size indicates the size of data that the receiver may receive at once. The receive window size is notified or advertised to the sender as the advertised window. The buffer indicates the size of the buffer assigned to the corresponding socket and may also indicate the upper limit of the receive window. The terminal may adjust the delayed ACK max count to thereby adjust the speed of change in the transmit window size at the sender.

Adjustment of the buffer size and adjustment of the advertised window size may both adjust communication performance of a process but may have the following differences in application.

As the advertised window size indicates the amount of data that the advertised window may receive, adjustment of the advertised window size may instantly regulate the data reception speed by, for example, increasing the advertised window size. On the other hand, adjustment of the buffer size may also be applied to UDP. As the buffer is an actual resource allocated to the socket, it affects memory efficiency. Particularly, in the existing system, the receiver cannot deal with UDP speed and the sender cannot know communication states. However, in the present disclosure, it is possible to control UDP regardless of the types or states of applications. Such UDP buffer control may be performed at the discretion of the receiver, and may alleviate influence of a UDP connection on other connections. Hence, UDP buffer control may be utilized in various ways.

Accordingly, adjustment of the buffer size and adjustment of the advertised window size may be in complementary relations. In the present disclosure, buffer size adjustment and advertised window size adjustment may be used properly according to the situation, resulting in more effective resource allocation.

In the present disclosure, per-process resource allocation may be performed in the following two ways.

Resource Allocation Scheme 1: decreasing the amount of resources allocated to a process.

Resource Allocation Scheme 2: increasing the amount of resources allocated to a process.

To decrease the amount of resources allocated to a process (Resource Allocation Scheme 1), the advertised window size and the buffer size may be both reduced. In this case, the advertised window size is reduced first and then the buffer size is reduced. If the buffer size is reduced first, as the sender performs data transmission on the basis of the advertised window configured before buffer size reduction, the receiver may fail to receive some of data sent by the sender. To prevent this problem, the terminal reduces the advertised window size first and then reduces the buffer size.

To increase the amount of resources allocated to a process (Resource Allocation Scheme 2), the buffer size is increased first and then the advertised window size is increased (in reverse of the order used in the Resource Allocation Scheme 1). Otherwise, the sender may send data whose size exceeds the capacity of the receiver, causing loss of some data. To prevent this problem, the terminal increases the buffer size first and then increases the advertised window size.

As described before, the buffer indicates the upper limit of the advertised window. In a protocol, the advertised window may change in size within the range indicated by the buffer. The various embodiments of the present disclosure do not require modification at the sender side and may be implemented through kernel modification for simultaneously adjusting the buffer size and advertised window size at the receiver side without addition of new hardware or software. Hence, the present scheme may be widely applied without significant algorithmic limitations.

In addition, while the buffer size may be set to an absolute value, the advertised window size may be set to an absolute value or the increment speed or decrement speed of the advertised window size may be adjusted. For example, the increment speed of the advertised window size may be accelerated for a high-priority process, and the decrement speed of the advertised window size may be accelerated for a low-priority process.

Next, a detailed description is given of adjusting the delayed ACK max count so as to change the increment speed or decrement speed of the transmit window size at the sender.

Delayed acknowledgement is used to enhance transmission efficiency by reducing the number of ACK responses and increasing the proportion of actual data in transmission. Such reduction of the number of ACK responses slows the increment of the transmit window size at the sender. This property is utilized in the present disclosure. Specifically, the QoS of a high-priority process may be increased by setting different delayed ACK max counts for different processes according to process priorities. For example, the delayed ACK max count for a high-priority process may be set to a small value for more frequent ACK transmission, accelerating the change speed of the transmit window size at the sender. To increase the amount of resources allocated to a high-priority process, the delayed ACK max count for the high-priority process may be decreased so as to accelerate the increment speed of the transmit window size at the sender. In other words, the number of actual ACK responses may be adjusted to thereby regulate the increment speed of the transmit window size at the sender. When the transmit window size at the sender is increased, the socket performance of the corresponding process is enhanced, increasing the throughput of the process. This effect is depicted in FIGS. 10A and 10B.

Figure 10A:
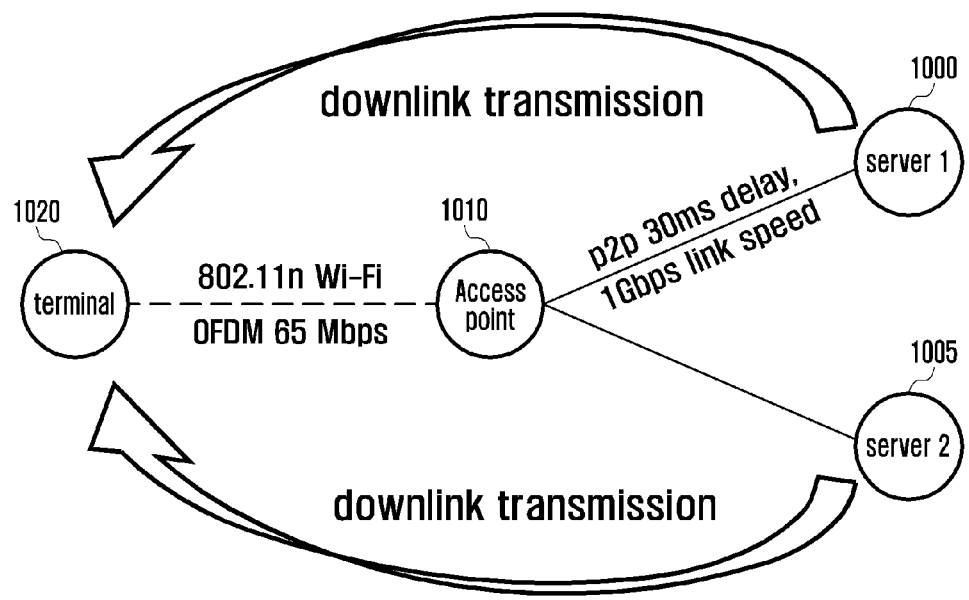
FIGS. 10A to 10B illustrate changes in throughput due to adjustment of the maximum count for delayed acknowledgements according to an embodiment of the present disclosure.
Figure 10B:
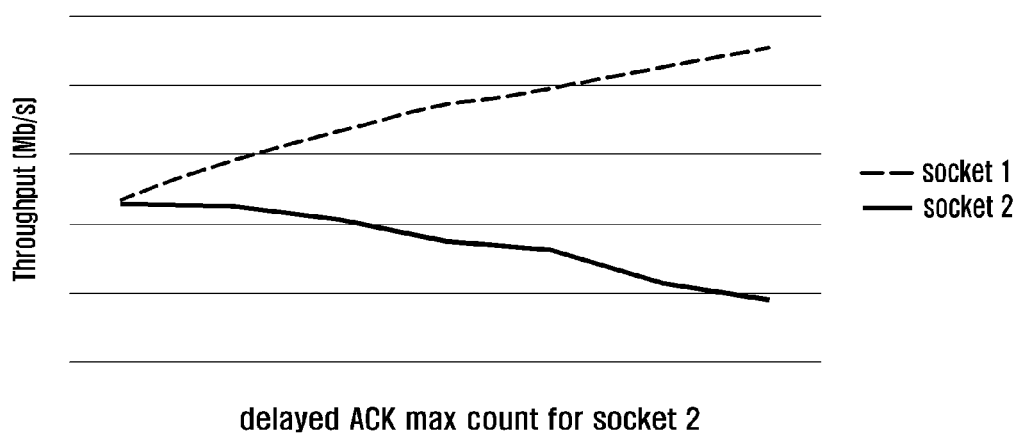

FIGS. 10A and 10B illustrate changes in throughput due to adjustment of the delayed ACK max count according to an embodiment of the present disclosure.

Specifically, FIG. 10A illustrates an environment where an experiment was conducted to verify the effects of adjustment of the delayed ACK max count. Network Simulator 3 was used for the experiment where two servers 1000 and 1005 performed downlink transmission to a mobile terminal via one access point through TCP connections and different delayed ACK max counts were used for evaluation. The delayed ACK max count for socket 1 associated with server 1000 was fixed to a default value of 2, and the delayed ACK max count for socket 2 associated with server 1005 was varied. The experiment was conducted for 10 seconds to identify the influence on the increment of the initial window size. FIG. 10B is a graph representing the results of the experiment.

It can be seen from FIG. 10B that as the delayed ACK max count for socket 2 increases, the throughput of socket 2 decreases and the throughput of socket 1 increases. This indicates that the delayed ACK max count may be adjusted to regulate the increment speed of the transmit window size at the sender, verifying the validity of the scheme of the present disclosure.

Next, a description is given of advantageous effects and applicability of the present disclosure.

In the present disclosure, it is possible to enhance buffer utilization efficiency by adjusting the size of an allocated buffer. About 20 sockets are created to access a typical website, causing consumption of a significant amount of memory. The scheme of the present disclosure may maximize the efficiency of memory utilization, and may be effectively applied to wearable devices experiencing the shortage of memory space in particular. In reality, the capacity of a miniaturized memory used for a wearable device is in the order of 256 megabytes or only about one-eighth of that of a current mainstream device. Considering that about 15 TCP or UDP connections are created to access a simplified mobile website (substantially similar to a desktop website), the buffer control scheme of the present disclosure enabling efficient memory utilization can be significantly effective for next generation devices including wearable devices.

Multipath TCP (MPTCP) aims to simultaneously support various communication techniques including Wi-Fi and cellular mobile communication along with the increasing performance of current mobile devices, MPTCP is expected to play a major role in next generation mobile communications. In MPTCP, advertised windows and buffers of sub-flows are shared. This may indicate that when an MPTCP connection is established, only one socket can be seen from the application layer, and also indicate that when multiple sub-flow connections are established, all the sub-flows may be controlled in a lump through buffer control. Hence, the scheme of the present disclosure may be fully effective for MPTCP and other subsequent protocol models without significant modifications.

Additionally, when a communication server is exposed to congestion or when a single access point is connected to multiple devices, the use of the scheme of the present disclosure may enable a device to win competition for limited access point bandwidths by encouraging fast transmission of resource requests and ACK responses. That is, it is highly probable for a device employing the present scheme to win competition against other devices not employing the present scheme.

When multiple devices compete for one access point, the device employing the present scheme may rapidly increase the buffer and receive window of a high-priority process to thereby occupy necessary resources more rapidly than the other devices. Hence, the device employing the present scheme may be able to sustain the desired QoS level.

When different devices or processes compete for the same resource, one device or process may continuously occupy the resource and the other device or process may continuously fail to occupy the resource. This is referred to as a starvation problem. Once a starvation problem arises, while the winner may continuously benefit from the problem, the loser may continuously suffer from the problem. When a starvation problem arises, even among devices having the same performance or functionality, a device having initiated communication later may continuously suffer from starvation. The scheme of the present disclosure does not attempt to unilaterally preoccupy communication resources but tries to increase the relative possibility for obtaining communication resources. Hence, the present scheme does not block nor disrupt other communication links. Consequently, the present disclosure enables a terminal to enhance its QoS level by winning competition against other devices without starving the other devices.

The present disclosure is described with a focus on TCP and UDP since they are the most widely used protocols. However, the concept of memory or window has been used in most communication protocols, and many other protocols have been developed on the basis of TCP or UDP. Hence, in addition to TCP and UDP, the present disclosure may be applied to various communication protocols including Simple Mail Transfer Protocol (SMTP), HyperText Transfer Protocol (HTTP), Internet Control Message Protocol (ICMP), Real-time Transport Protocol (RTP), Datagram Congestion Control Protocol (DCCP), Address Resolution Protocol (ARP), Reverse Address Resolution Protocol (RARP), Routing Information Protocol (RIP), Interior Gateway Routing Protocol (IGRP), and Post Office Protocol Version 3 (POP3). Such applications will fall within the scope of the present disclosure. Additionally, as the buffer is utilized in the present disclosure, the present disclosure may be applied to those protocols not traversing the transport layer (e.g. Internet Group Management Protocol (IGMP), Open Shortest Path First (OSPF), Internet Control Message Protocol (ICMP)), and to systems based on those applications not traversing the transport layer. Hence, the present disclosure has a very wide range of applicability, and various other applications not explicitly described in the specification may fall within the scope of the present disclosure.

Various embodiments of the present disclosure have been described with reference to the accompanying drawings. Specific terms or words used in the description should be construed in accordance with the spirit of the present disclosure without limiting the subject matter thereof. It should be understood that many variations and modifications of the basic concepts described herein will still fall within the spirit and scope of the present disclosure as defined in the appended claims and their equivalents.

What is claimed is:

1. A method of resource allocation for a terminal, the method comprising:
   updating a running process list based on process related information for one or more processes;
   determining a resource amount for each process listed in the running process list according to priority information of the process related information; and
   allocating resources to at least one process listed in the running process list according to the determined resource amount for the at least one process
   wherein updating the running process list comprises:
      extracting an identifier from information on a created process;
      determining whether the created process is listed in the running process list by use of the identifier; and
      adding the created process to the running process list if the created process is not listed in the running process list.

2. The method of claim 1, wherein allocating resources to the at least one process comprises adjusting at least one of a buffer size and an advertised window size of at least one of the one or more processes.

3. The method of claim 2, wherein the advertised window has information on an amount of data that the terminal is able to receive at once and the information is advertised by the terminal.

4. The method of claim 1, wherein allocating resources to at least one process comprises adjusting a number of delayed acknowledgement (ACK) messages to be sent based on the priority information.

5. The method of claim 1, wherein the process related information comprises a process identifier and protocol information.

6. The method of claim 1, wherein allocating resources to at least one process comprises:
   increasing a buffer size first before increasing a receive window size if the resource amount allocated to a corresponding process is increased; and
   decreasing the receive window size first before decreasing the buffer size if reducing the resource amount allocated to the corresponding process.

7. The method of claim 1, wherein the resource amount to be allocated to a process is determined based on communication characteristic information containing at least one of an average amount of data communication and a data communication pattern of the process.

8. The method of claim 1, wherein the priority information of a process is determined based on whether the process is currently running.

9. The method of claim 1, wherein determining the resource amount for the each process listed in the running process list is performed on a basis of pre-stored information regarding an amount of resources requested by the each process listed in the running process list and the priority information.

10. A terminal, comprising:
a communication unit configured to transmit and receive signals; and
a control unit configured to: update a running process list based on process related information for one or more processes, determine a resource amount for each process listed in the running process list according to priority information of the process related information, and allocate resources to at least one process listed in the running process list according to the determined resource amount for the at least one process,
wherein, to update the running process list, the terminal extracts an identifier from a created process, determining whether the created process is listed in the running process list by use of the identifier, and adding the created process to the running process list if the created process is not listed in the running process list.

11. The terminal of claim 10, wherein to allocate resources to the at least one process, at least one of a buffer size and an advertised window size of at least one of the one or more processes is adjusted.

12. The terminal of claim 11, wherein the advertised window has information on an amount of data that the terminal is able to receive at once and the information is advertised by the terminal.

13. The terminal of claim 10, wherein to allocate resources to at least one process, a number of delayed acknowledgement (ACK) messages to be sent on the basis of priority information contained in the running process list is adjusted.

14. The terminal of claim 10, wherein the process related information comprises a process identifier and protocol information of a process.

15. The terminal of claim 10, wherein to allocate resources, a buffer size is increased first before a receive window size is increased if the amount of resources allocated to a corresponding process is increased, and the receive window size is decreased first before the buffer size is decreased if the amount of resources allocated to a corresponding process is reduced.

16. The terminal of claim 10, wherein the resource amount to be allocated to a process is determined based on communication characteristic information containing at least one of an average amount of data communication and a data communication pattern of the process.

17. The terminal of claim 10, wherein the priority information of a process is determined based on whether the process is currently running.

18. The terminal of claim 10, wherein the resource amount for the each process listed in the running process list is determined on a basis of pre-stored information regarding an amount of resources requested by the each process listed in the running process list and the priority information.

* * * * *